June 8, 1954  W. J. CARSON  2,680,330
TOY VEHICULAR MODEL
Filed March 21, 1950
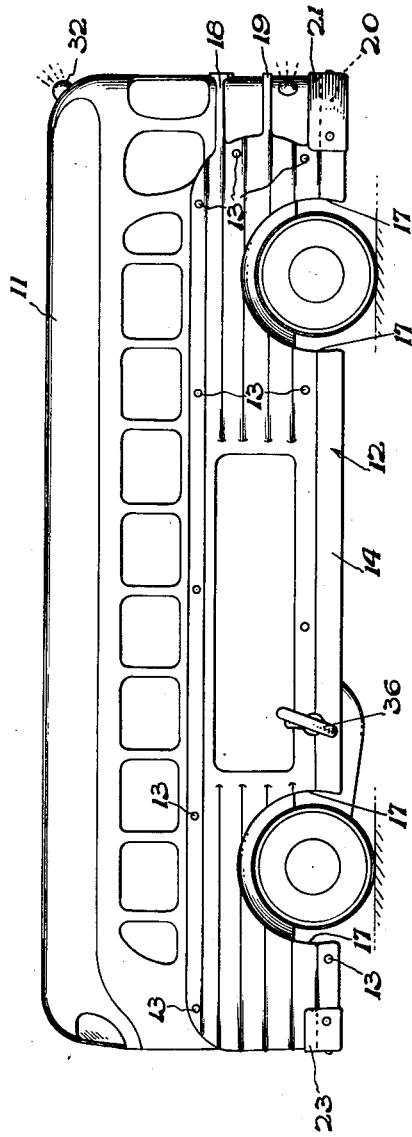
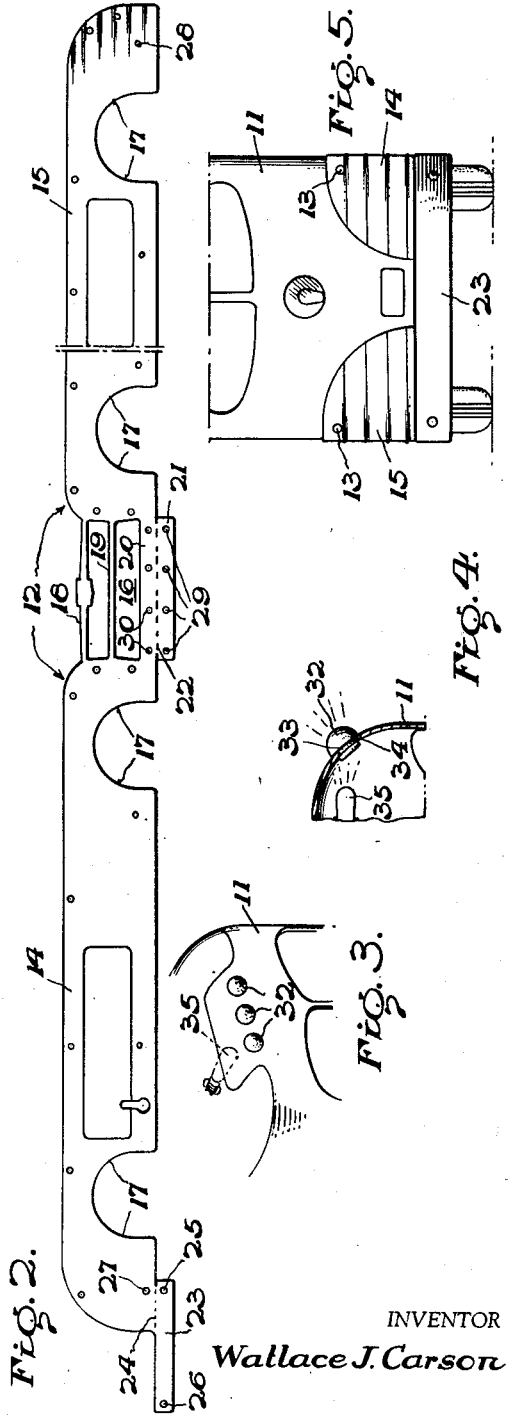
INVENTOR
Wallace J. Carson.
BY Albert J. Kramer
ATTORNEY Patented June 8, 1954

2,680,330

UNITED STATES PATENT OFFICE 2,680,330

TOY VEHICULAR MODEL

Wallace J. Carson, Pittsburgh, Pa.

Application March 21, 1950, Serial No. 150,960

2 Claims. (Cl. 46—222)

This invention relates to toys and is more particularly concerned with model vehicular toys.

One of the objects of this invention is the provision of a model vehicular toy of the bus type which is a miniature replica of well known buses, such as the Greyhound buses, having a distinctive trim.

Another object of the invention is the provision of means for applying distinctive exterior trims or portions thereof to such vehicles.

A still further object of the invention is the provision of a flat metal strip representing the distinctive trim of a bus or other vehicle for application to the outer surface of the vehicle body and which is secured in place to the vehicle.

Other objects and advantages will appear from the following description and accompanying drawing, in which drawing:

Fig. 1 is a side elevational view of a model vehicle constructed in accordance with the invention.

Fig. 2 is a developed view of the trim shell, partly broken away.

Fig. 3 is a fragmentary isometric view of the upper part of the model.

Fig. 4 is a section along the line 4—4 of Fig. 3.

Fig. 5 is a rear view of the same embodiment.

Referring with more particularity to the drawing in which like numerals designate like parts, the embodiment illustrated comprises a block, such as of wood or other suitable material, constituting a vehicular body 11, such as a bus, which may be dimensioned to scale. The bus illustrated is of a conventional type commonly used by the Greyhound Bus Company.

The ornamental trim of the body and bumpers is formed of a one piece shell 12 of any suitable material, such as aluminum or other sheet metal, plastic sheet, etc. disposed around the body below the window level and secured in position by means of screws, nails or rivets 13.

The ornamental strip illustrated has side sections 14 and 15 against the vertical side faces of the base body 11, and a front section 16 between the side sections and against the vertical front face of said base body. The side sections are provided with cut out portions 17 to follow the curvature of the body around the wheels. The front section comprises a plurality of horizontal bars 18, 19 and 20. The lowermost bar 20 has a lower extension strip 21 which becomes forwardly offset from the bar 20 and forms the front bumper when bent upward along the fold line 22.

One of the side sections, say the side section 14, is also provided with a dependent extension strip 23 extending from the outer end and which when bent upward along the fold line 24 becomes rearwardly offset and forms the rear bumper which, in normal position, extends across the back of the body. (See Fig. 5.)

The shell 12 is also provided with a number of apertures for receiving the securing screws, nails or rivets 13. However, some of these apertures are disposed in definite relation to others. For example, the apertures 25 and 26 at the outer ends of the rear bumper 23 register with apertures 27 and 28 of the side sections 14 and 15, respectively, when the strip 23 is bent upward and the strip 12 is in normal position on the body of the model. Also apertures 29 through the front bumper strip 21 register with apertures 30 through the bar 20 when said bumper strip is bent upward in fixed position. By these means, the bumpers are held secure in place and are prevented from becoming bent out of shape during use.

To simulate lights on the body of the vehicle, such as a group of signal lights, light transmitting plastic, mushroom shaped buttons 32, such as of "lucite," having stems 33 are mounted by disposing the said stems in apertures 34 of the body. These buttons are held in position by flanging the outer ends of the stems, as illustrated, if they are of a thermoplastic material or by any other suitable means. An electric light bulb 35 is disposed within the hollow of the vehicle body behind the group of buttons, whereby light from the bulb is transmitted through all the plastic buttons simultaneously.

Although this invention has been described and illustrated with respect to a particular type of bus, it is to be understood that it is equally applicable to other types of busses and other types of toy vehicles as well as to actual full size vehicles other than toys.

It is within the scope of this invention for the model to be either of the self-propelled type, as indicated by the wind up key 36, or of the hand propelled type.

Having thus described my invention, I claim:

1. A model vehicle comprising a block constituting a body, a one-piece metallic shell having portions thereof cut out to define ornamental features of the vehicle, said shell having two substantially symmetrical sections disposed on either side of the vehicle body and a plurality of vertically spaced strips connecting said sections, the lowermost strip having a dependent bar bent upward to a forwardly offset position in front of said lowermost strip to simulate the front bumper of the vehicle, and a dependent strip integral with one of said sections bent upward in a rearwardly offset position to simulate the rear bumper of the vehicle, and means securing said shell to said body.

2. A model vehicle comprising a block constituting a rigid base body, said body having vertical faces at the front and sides thereof defining the general shape of the vehicle, a one-piece ornamental shell about said body in contact with said faces, said shell having cut out portions defining ornamental features of the vehicle, said shell comprising two substantially symmetrical side sections, one against either side face of the body, and a front section having a plurality of vertically spaced horizontal strips against the front face of the body, the lowermost strip of the front section having a dependent bar bent upwardly to a forwardly offset position to simulate the front bumper of the vehicle.

References Cited in the file of this patent

UNITED STATES PATENTS

| Number | Name | Date |
|---|---|---|
| 815,504 | Bartlett | Mar. 20, 1906 |
| 1,399,247 | Bloomfield | Dec. 6, 1921 |
| 1,547,176 | Lazaron | July 28, 1925 |
| 1,772,890 | Fuchs | Aug. 12, 1930 |
| 1,928,883 | De Long | Oct. 3, 1933 |
| 1,932,368 | Bowman | Oct. 24, 1933 |
| 1,984,258 | Dowst | Dec. 11, 1934 |
| 1,991,654 | Brubaker | Feb. 19, 1935 |
| 2,065,208 | Bischof | Dec. 22, 1936 |
| 2,072,374 | Manoil | Mar. 2, 1937 |
| 2,388,340 | Ripley | Nov. 6, 1945 |